United States Patent [19]

Merritt et al.

[11] Patent Number: 5,027,720

[45] Date of Patent: Jul. 2, 1991

[54] EMISSIONLESS FURNACE BOILER SYSTEM

[76] Inventors: Thomas D. Merritt, P.O. Box 380016, Miami, Fla. 33238; Alexander Blake, 4 Walnut Hollow La., Holmdel, N.J. 07733

[21] Appl. No.: 481,959

[22] Filed: Feb. 20, 1990

Related U.S. Application Data

[63] Continuation-in-part of Ser. No. 255,960, Oct. 11, 1988, Pat. No. 4,903,499.

[51] Int. Cl.$^5$ .............................................. F23B 7/00
[52] U.S. Cl. ...................................... 110/234; 62/149; 110/203; 110/216; 122/1 R; 122/7 R; 122/20 B
[58] Field of Search ................ 62/149, 292; 122/1 R, 122/7 R, 20 B, 4 R; 110/203, 216, 233, 234

[56] References Cited

U.S. PATENT DOCUMENTS

| | | | |
|---|---|---|---|
| 4,539,817 | 9/1985 | Staggs et al. | 62/149 |
| 4,660,511 | 4/1987 | Anderson | 122/20 B |

*Primary Examiner*—Edward G. Favors
*Attorney, Agent, or Firm*—M. K. Silverman

[57] ABSTRACT

An emissionless furnace boiler and effluent gas recovery system includes a pressure vessel having a fluid input and fluid output. The system is capable of maintaining an entropy characteristic equal to at least the condensing pressure of the lowest entropy gas of the gases constituting a processed effluent gas discharge. There is also provided a hollow, annular jacket having a surface in thermal communication with the pressure vessel, the jacket having an axis in substantial alignment with the gravity vector and the jacket including a fluid input and fluid output. The system also includes a fluid path beginning internally of said pressure vessel, passing through the vessel, through the fluid output means, continuing externally of the vessel, and extending between the vessel and the input of the jacket. Within the fluid path, but prior to the input of the jacket, there is provided an expansion valve for selectively changing the volume of fluid flowing from the vessel prior to its entry into the jacket. The system yet further includes a compressor having an input in fluid communication with the output of the annular jacket, the compressor itself having an output in fluid communication with the input of the pressure vessel.

8 Claims, 5 Drawing Sheets

EMISSIONLESS FURNACE BOILER SYSTEM

REFERENCE TO RELATED APPLICATION

This case is a continuation-in-part of application Ser. No. 07/255,960, filed Oct. 11, 1988, entitled Refrigerant Recovery System U.S Pat. No. 4,903,499.

BACKGROUND OF THE INVENTION

In recent years considerable concern has grown with regard to the phenomena known as acid rain. This phenomenon is caused by the condensation of gases such as sulphur dioxide which are emitted into the atmosphere during the burning of sulphur-containing fossil fuels such as coal. The burning of sulphur-containing coal typically occurs during the production of electricity as fossil fuels are burned to produce heat to, in turn, produce steam which is employed to effect the turning of a turbine in the production of electricity.

In addition, the burning of fossil fuels produces other harmful effluents including carbon dioxide, carbon monoxide, and nitrous oxide. These effluents have been deemed to be unsafe for human intake and are believed to be the source of another adverse environmental phenomena known as the greenhouse effect, a result of which is global warming.

Accordingly, it is to be appreciated that the burning of fossil fuels in the production of electricity and in other industrial processes is believed to be a primary source of two of the most environmentally threatening phenomena of the day, namely, acid rain and the greenhouse effect.

In order to avoid resort to the nuclear option in achieving levels of production of electricity that are necessary to sustain industrial and other needs, it has long been recognized that the capture of noxious emissions of effluent gases is a requirement for environmental and human safety. Most approaches to the problem of effluent emissions known in the prior art consist of the treatment of the discharge of the gases with absorbents, catalysts, and other such chemical and mechanical approaches for the removal and/or conversion of the gaseous effluents. These prior art efforts have proven to be expensive and cumbersome to implement and, as such, have not enjoyed widespread acceptance except in those areas where the strictest governmental enforcement occurs. Therefore, a need has long existed for a cost-effective means of control of effluent gases from industrial processes.

The present invention provides an emissionless furnace boiler system that not only captures effluent gas emissions but, in addition, separates and re-cycles most of these emissions to thereby further diminish the cost of implementation of the inventive system.

SUMMARY OF THE INVENTION

The instant invention relates to an emissionless furnace boiler and effluent gas recovery system in which a plurality of processed effluent gases are normally discharged at the output of an industrial process such as the burning fossil fuel in the generation of electricity.

The system more particularly includes a pressure vessel having fluid input means and fluid output means, the system capable of maintaining a vessel entry pressure characteristic equal to at least the condensing pressure of the lowest entropy gas of the gases comprising said processed effluent gas discharge. There is further provided a hollow, annular jacket having a surface thereof in thermal communication with said pressure vessel, said jacket having an axis in substantial alignment with the gravity vector and further including fluid input and fluid output means.

The system also includes a fluid path beginning internally of said pressure vessel, passing through said vessel, through said fluid output means thereof, continuing externally of said vessel, and extending between said vessel and sad input means to said jacket. Within said fluid path, but prior to said input means of said jacket, there is provided expansion means for selectively increasing the volume of fluid flowing from said vessel prior to its entry into said jacket. The system yet further includes compression means having an input in fluid communication with said output of said annular jacket, said compression means itself having an output in fluid communication with said input means of said pressure vessel.

The system as above described operates in combination with apparatus for the delivery of said processed industrial effluent gas discharge, said apparatus comprising an input to said compression means. In operation, the inventive system permits the effluent gas having the lowest entropy characteristic to accumulate in liquid form at the bottom of the pressure vessel, while those effluent gases having a higher entropy pressure will settle, in strata, above the condensed gas according to Dalton's Law. The temperature gradient between said pressure vessel and said jacket will be controlled by thermal communication between said vessel and said jacket.

It is therefore an object of the present invention to provide an emissionless furnace boiler system.

It is a further object of the present invention to provide an effluent gas recovery system in which gases from an effluent gas output, of an industrial process, may be liquified without escape into the atmosphere.

It is a further object to provide a system of the above type in which other effluent gases having a bigger entropy pressure will occupy, in gaseous form, strata within a pressure vessel, above said liquified effluent, such that such stratified effluent gases may be separately removed from the system.

It is a yet further object of the invention to recycle selective effluent gases to contribute to industrial burning processes.

It is a still object of the invention to make selective use of separated, stratified effluent gases for re-use in non-burning industrial processes.

It is a yet further object of the invention to provide an apparatus for use with a furnace boiler and effluent gas discharge thereof, which will permit liquification and recovery of the constituent gases comprising the gas discharge of an industrial process.

The above and yet other object and advantages of the present invention will become apparent from the hereinafter set forth Detailed Description of the Invention, the Drawings, and Claims appended herewith.

DETAILED DESCRIPTION OF THE INVENTION

Figure 1:
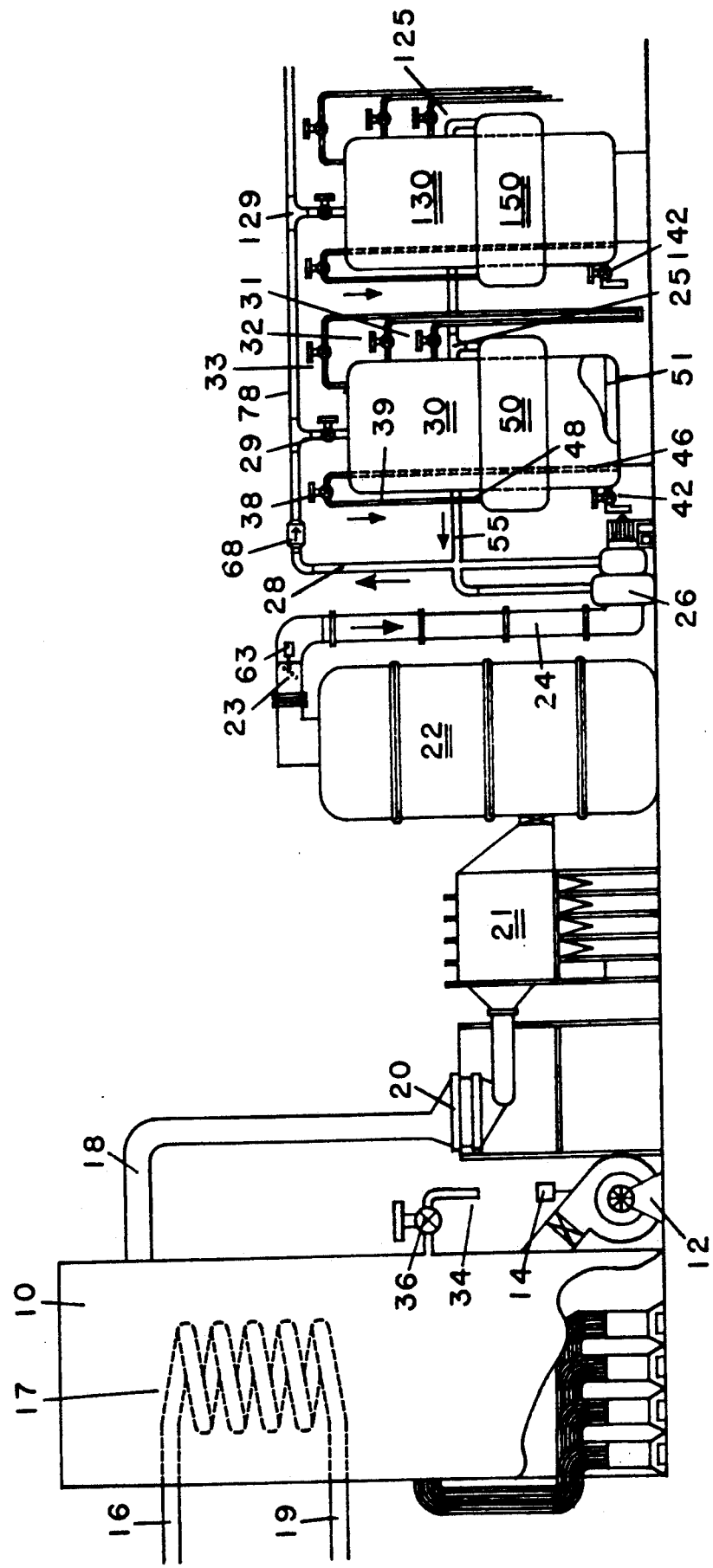
FIG. 1 is a schematic representation of the inventive emissionless furnace system.
Figure 2:
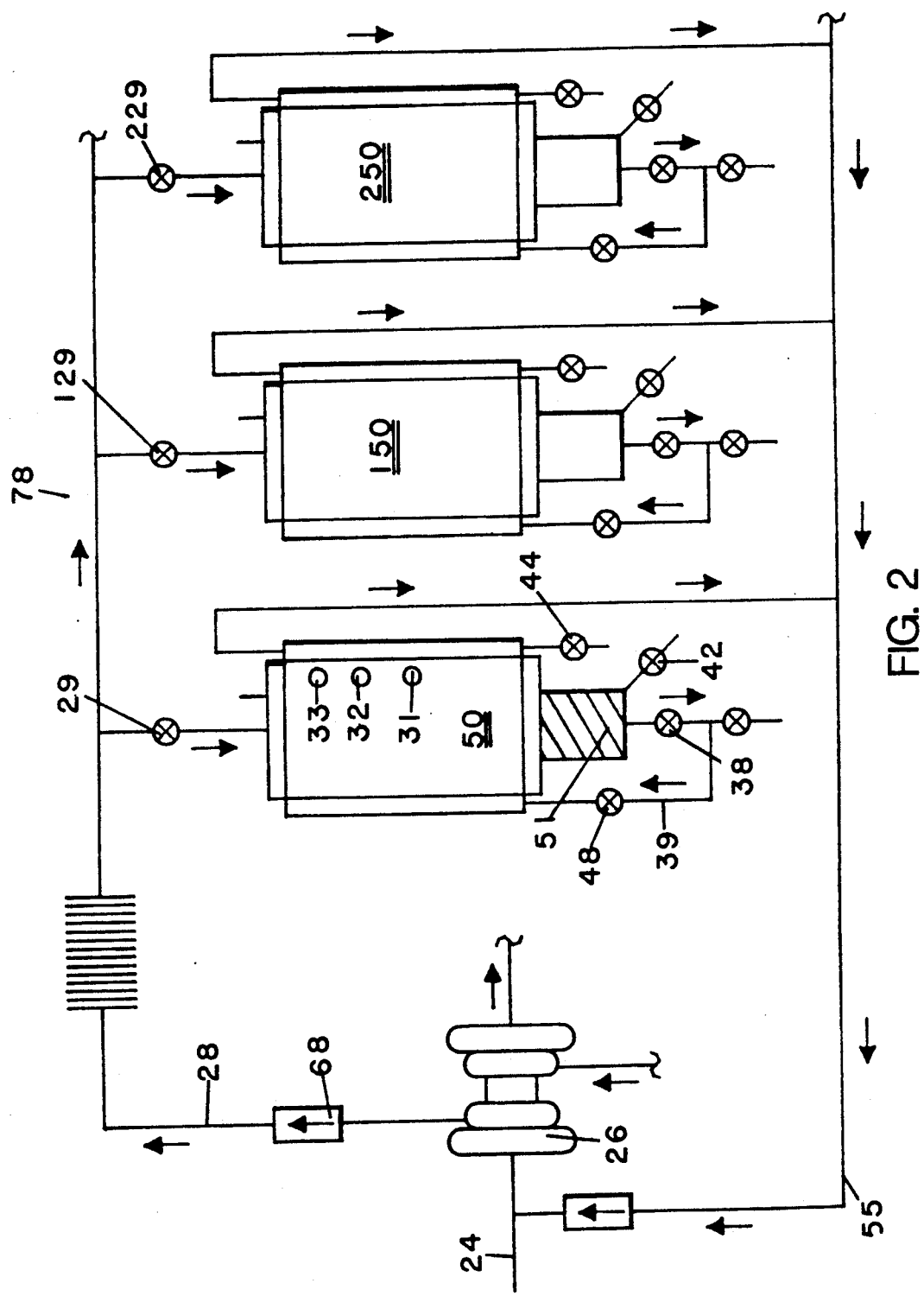
FIG. 2 is a schematic view of the refrigeration circuit section thereof.
Figure 3:
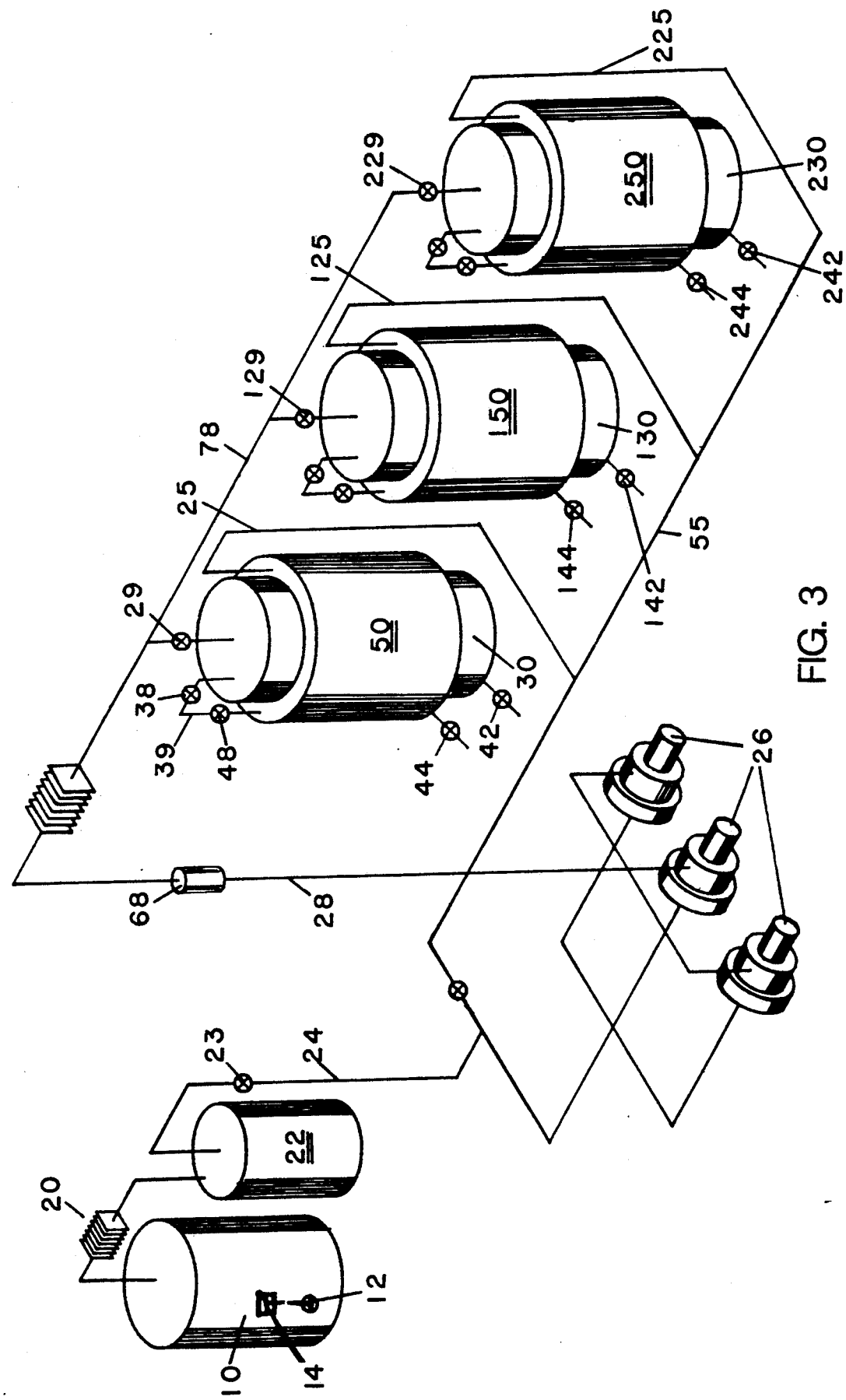
FIG. 3 is an exploded isometric view of a system depicting the use of multiple compressors.

With reference to FIGS. 1 to 3, there is shown a fossil fuel fired furnace boiler 10 provided with means for air entry 12 and a related air controller 14 which is operated by a system controller 100 (later more fully described below).

The furnace 10 is provided with conventional water piping 16 which provides water to coils 17 of the furnace boiler and, as an output 19 thereof, steam is provided for use, typically, with the turbine of an electrical generation system.

All fossil fuel burning systems whether of the type employed in generation of electricity or other industrial processes, exhibit a flue gas exit 18 from which various gaseous effluents are discharged. In the prior art, the essential problem has been that of the discharge of such gases into the atmosphere. Alternatively, and as is noted in the Background of The Invention above, efforts to capture or prevent discharge of these flue gases into the atmosphere have generally comprised the use of chemical means which means have proven to be lacking in efficiency and/or cost-effectiveness.

In the instant system, flue gases exit flue 18 and then enter a heat exchanger 20 where the residual heat of the gases is removed. From the heat exchanger, the gases are drawn into an electro-static precipitator 21 of the type used in conventional furnaces.

In the precipitator 21 all particulate matter such as dust, ash and soot are removed.

From precipitator 21, the gases are drawn into a low pressure accumulator 22. In this area, any particles which may have escaped precipitator 21 will be filtered out. From the accumulator 22, low pressure gases pass through damper 23 and its associated controller 63 into conduit 24. It is noted that damper controller 63 is in electrical feedback communication with air entry controller 14, the purpose of this feedback relationship being to assure that sufficient gas flow will reach conduit 24. That is, the volume, velocity and pressure of processed flue gases reaching conduit 24 will be a function of the amount of air originally forced or drawn into furnace boiler 10 at air entry means 12. Accordingly, controller 14 of air entry means 12 must be in electrical or pneumatic feedback communication with damper controller 68 to assure that a sufficiency quantity of treated flue gas, at a desired pressure level, will be available to conduit 24.

From accumulator 22, the treated effluent gases are drawn into a centrifugal compressor 26 where they are compressed to a high pressure of about 400 psi. These compressed gases then advance through high pressure conduit 28, through one way valve 68, through control valve 29, and into pressure vessel 30 where a sufficient pressure is maintained to at least match the condensing entropy pressure of sulphur dioxide which, typically, will have the lowest entropy of those effluent gases that are generated in fossil fuel burning processes. As the sulphur dioxide condenses within vessel 30, it will accumulate in liquid form 51 at the bottom of vessel 30.

A certain amount of the liquified sulphur dioxide will enter vertical high pressure (400 psi) liquid conduit 46 which is located within vessel 30, and it will eventually pass through control valve 38.

From control valve 38, the liquid sulphur dioxide moves through conduit 39 and through adjustable expansion valve 48 which causes a change of state to vapor. This vapor and some liquid enter an annular jacket 50 which surrounds vessel 30 and is in thermal communication therewith. Sulphur dioxide, now in the vapor state, moves into low pressure conduit 25 at about a zero pressure, joining low pressure conduit 55 which returns to centrifugal compressor 26.

The above comprises a refrigeration circuit in which the working fluid, i.e. the sulphur dioxide, moves from vessel 30 through high pressure conduit 46, thorough control valve 38, through conduit 39, through expansion valve 48, into annular jacket 50, through low pressure conduits 25 and 55, into centrifugal compressor 26, through high pressure conduit 28, and through control valve 29 back into vessel 30. Therein, the lowest entropy pressure gas of the group of discharged effluent gases within conduit 24 is moved thru said circuit and said gas functions as the refrigerant of the circuit while the higher entropy pressure gases entering the vessel 30 will accumulate in strata above the liquid 51 of the sulphur dioxide accumulated at the bottom of vessel 30. Accordingly, those flue gases which are non-condensable at the entropy pressure of sulphur dioxide will accumulate in strata above liquid 51 according to Dalton's Law. Respective levels of the non-condensable gases associated with fossil fuel burning appear at the levels of conduits 31, 32 and 33 in FIGS. 1 to 3. More levels of conduits may be provided if more than three non-condensable gases are present.

In the burning of coal fuel, the first layer of non-condensable gas will be nitrous oxide, the second level will be carbon dioxide, and the highest level will be carbon monoxide. In the case of nitrous oxide, this compound can either be removed from the system for other industrial usages or may be fed back to furnace boiler 10 at return 34 and combusted, thereby decreasing the cost of operating the furnace boiler itself, or the nitrous oxide may be used as a fuel for a gas turbine powdered compressor such as compressor 26.

The carbon dioxide may be removed through conduits, for other industrial uses. The carbon monoxide can be re-introduced into the furnace combustion area of the furnace or can be solidified and used as building materials or landfill.

Figure 1A:
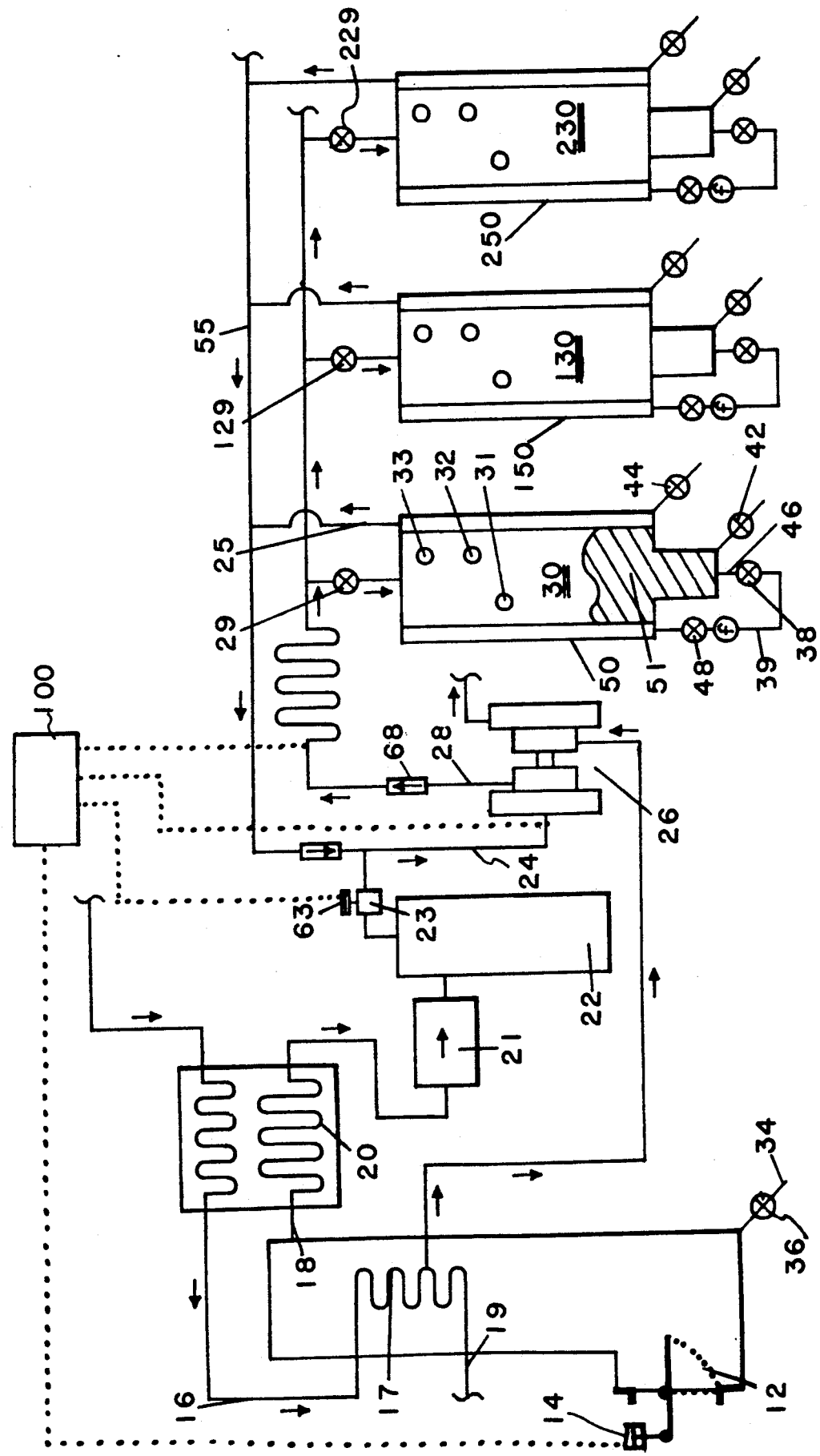
FIG. 1A is a further detail of FIG. 1 showing a steam powered compressor means having furnace air entry control means therewith.

With reference to FIG. 1A, it is noted that said system controller 100 regulates said air entry controller 12 and also regulates damper controller 63. Further, the system controller 100 senses the pressure at the low and high pressure sides of compressor 26 to provide feedback control to said controllers 24 and 63, thereby matching the air intake of the inventive system with the load of the compressor 26.

As a requirement to the operation of the system, it is noted that at a predetermined pressure, control valve 29 will close and control valve 129 will open, thereby taking vessel 30 out of the circuit, while bringing vessel 130 and jacket 150 into the system. As may be noted in FIG. 2, any number of units of this type may be added to accommodate the flue gas output of a given facility. It is noted that a spigot 42 is provided at the bottom of vessel 30 to permit periodic drainage of the condensed sulphur dioxide from the pressure vessel 30. Moreover, some sulphur dioxide will always be left in vessel 30 to permit the desired refrigeration above described.

Also provided is a valve 44 which permits the discharge of any contaminants such as dirt, oil or unwanted chemicals which may accumulate in the lower area of annular jacket 50. It is to be appreciated that compression means, other than centrifugal compressor 26, may be employed. However, centrifugal compressors have been proven to be highly cost-efficient devices for the compressing of gases.

Also shown to the right of furnace boiler 10 is the nitrous oxide return 34 which, in the preferred embodiment, is in fluid communication with conduit 31, above described, which communicates with vessel 30 at the lowest level of accumulated non-condensed gases. Valve 36 provides a control means for the regulation of entry of the nitrous oxide into furnace boiler 10.

The above described method of employing the lowest pressure entropy gas, in a family of discharged industrial gases, as the refrigerant in a refrigeration circuit including a pressure vessel for the capture of the liquified lowest entropy pressure gas in which said vessel is in fluid communication with a surrounding annular jacket in thermal contact with the vessel, provides a valuable method for recovering effluent gases from industrial processes and, thereby, for providing an emissionless furnace boiler of a type long sought in the art.

Figure 5:
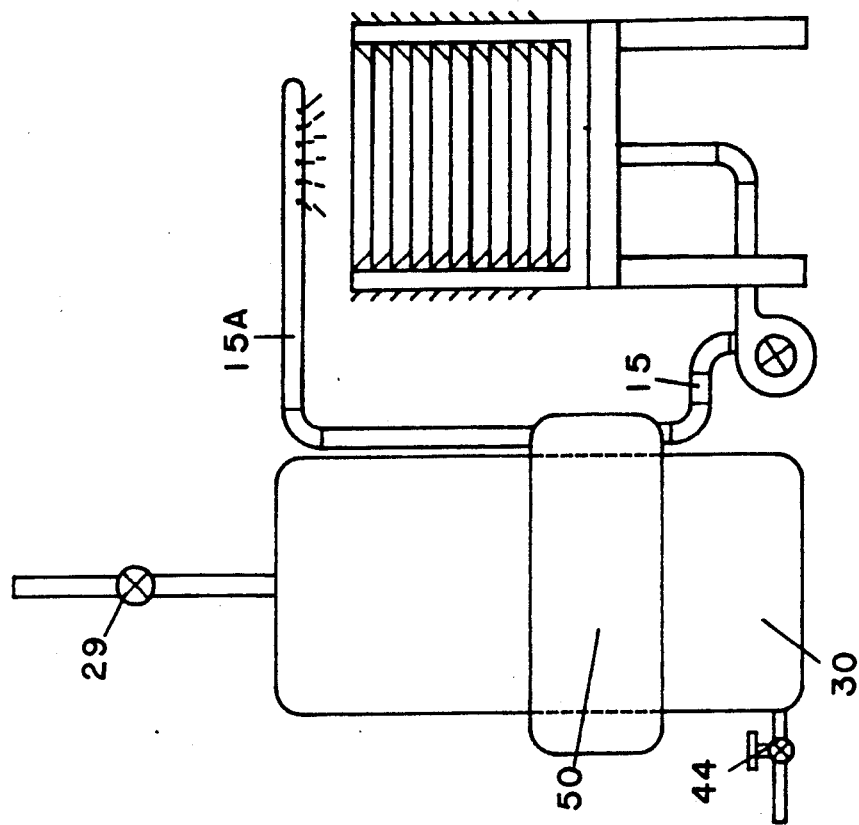
FIG. 5 is a vessel used as water cooled condenser in conjunction with water tower means.
Figure 4:
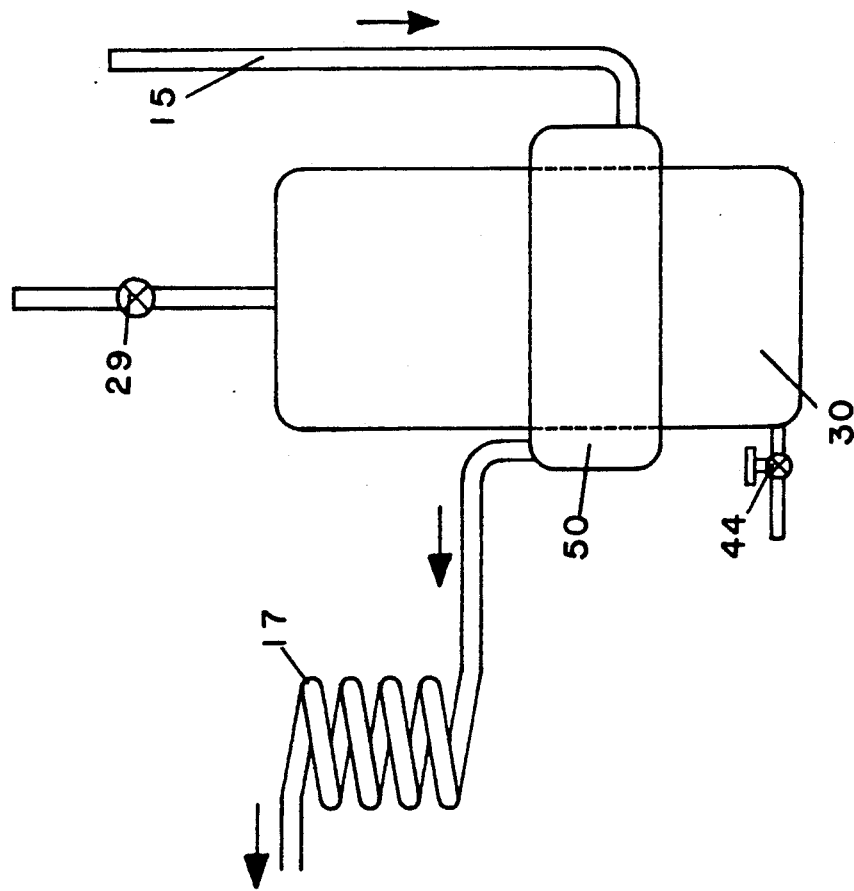
FIG. 4 is a schematic view of the refrigeration circuit used as a water preheat means for the furnace boiler and its water supply.

In FIGS. 4 and 5 there are shown further embodiments of the present invention employing an alternate or additional annular jacket 60 provided about pressure vessel 30. This alternate jacket 60 is taken out of the refrigeration circuit by connecting conduit 39 and expansion valve 48 to low pressure conduit 25. Thereby the jacket 60 may be used as a water cooled condenser. Vessel 30 can then be used to preheat water entering the boiler as demonstrated in FIG. 4. Also when vessel 30 and jacket 60 are being used as a water cooled condenser, water can be circulated through conventional cooling means such as a water tower shown in FIG. 5.

Accordingly, while there has been shown and described the preferred embodiment of the present invention, it is to be understood that the invention may be embodied otherwise than is herein specifically illustrated and described and that, within said embodiments, certain changes in the detail of construction in the form and arrangements of the parts my be made without departing from the underlying idea or principles of this invention and in the scope of the claims appended herewith.

With further reference to FIGS. 1, 1A, 2, and 3, it is noted that vessels 130 and 230 are identical to vessel 30 and that annular jackets 150 and 250 are identical to said annular jacket 50. Further, spickets 142 and 242 are identical to said spickets 42, while low pressure conduits 125 and 225 are identical to said low pressure conduit 25. Further, control valves 129 and 229 are identical to said control valve 29. Also, discharge valve 244 is identical to said discharge valve 44. As may be noted from said FIGS. 1 thru 3, reference numerals of the 100 series represent a second stage, otherwise identical to the first stage of the inventive system, while reference numerals in the 200 series correspond to otherwise identical elements of a third stage, otherwise the same as the first stage above described.

Having thus described our invention, what we claim as new, useful and non-obvious and, accordingly, secure by Letters Patent of the United States is:

1. An emissionless furnace boiler and effluent recovery system in which a plurality of effluent gases are normally discharged from said boiler, the system comprising:
   (a) a pressure vessel, having fluid input means and fluid output means, said vessel capable of maintaining an entropy pressure characteristic at least equal to that of the condensing entropy pressure of the lowest entropy gas of said discharged effluent gases;
   (b) a hollow, annular jacket having a surface thereof in fluid communication with said pressure vessel, said annular jacket having an axis in substantial alignment with the gravity vector, said jacket further including fluid input means and fluid output means;
   (c) a fluid path commencing internally of said pressure vessel, passing longitudinally through said vessel, through said output means of said vessel, continuing externally of said vessel, and extending between said vessel output and said input means of said annular jacket;
   (d) within said fluid path and before said input means of said jacket, expansion means for selectively expanding the volume of fluid flowing from said vessel prior to its entry into said jacket;
   (e) compression means having an input in fluid communication with said output of said annular jacket, said compression means itself having an output in fluid communication with said input of said pressure vessel; and
   (f) apparatus for delivery of processed industrial flue gases, said apparatus comprising an input to said compression means, whereby that flue gas having the lowest entropy pressure will accumulate in liquid form at the bottom of said pressure vessel and those flue gases having a higher entropy pressure will settle, in strata, according to their respective entropy pressures, above the condensed gas and, further whereby, the temperature gradient between said vessel and said jacket is controlled by reason of thermal communication between said vessel and said jacket, this causing an enhanced refrigeration efficiency of the combination of said vessel and said jacket.

2. The system as recited in claim 1, further comprising:
   a liquid input to said boiler;
   a heat exchanger in thermal communication with said flue gas discharge of said furnace; and
   an output of said heat exchanger in thermal communication with liquid input to said furnace boiler.

3. The system as recited in claim 1, further comprising:
   an air input means to said furnace; and
   control means for said air input responsive to both a fluid pressure requirement of said compression means and an oxygen requirement of the furnace boiler.

4. The system as recited in claim 3, further comprising:
   means for accumulating said flue discharge to provide an uniform pressure input to said compression means.

5. The system as recited in claim 4, further comprising:
   an electrostatic precipitator fluidly oriented between said heat exchanger and said accumulating means.

6. The system as recited in claim 3, further comprising:

a steam output of said furnace boiler; and means for steam powering said compression means employing said steam output of said furnace boiler.

7. The system as recited in claim 4, further, comprising:

a damper and related damper control means for regulating fluid flow between said accumulator and compression means.

8. The system as recited in claim 7, further comprising:

means for selectively exhausting and storing various strata of non-condensable gases accumulated within said pressure vessel above the condensed flue gas.

* * * * *